(12) United States Patent
Lee et al.

(10) Patent No.: US 8,758,927 B2
(45) Date of Patent: Jun. 24, 2014

(54) SECONDARY BATTERY

(75) Inventors: Donghyun Lee, Suwon-si (KR);
Jeomsoo Kim, Suwon-si (KR);
Heungtaek Shim, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 331 days.

(21) Appl. No.: 12/801,715

(22) Filed: Jun. 22, 2010

(65) Prior Publication Data

US 2011/0052963 A1    Mar. 3, 2011

(30) Foreign Application Priority Data

Aug. 25, 2009    (KR) .................. 10-2009-0078815

(51) Int. Cl.
*H01M 2/24* (2006.01)
(52) U.S. Cl.
USPC ............................ 429/148; 429/149; 429/160
(58) Field of Classification Search
USPC ................................................ 429/121–347
See application file for complete search history.

(56) References Cited

U.S. PATENT DOCUMENTS

2003/0059669 A1    3/2003    Mittal et al.

FOREIGN PATENT DOCUMENTS

| JP | 61-39860 U | 3/1986 | | |
|----|------------|--------|---|---|
| JP | 07-022003 A | 1/1995 | | |
| JP | 10-261440 A | 9/1998 | | |
| JP | 2000-77048 A | * 3/2000 | ............. | H01M 2/10 |
| JP | 2002-222639 A | 8/2002 | | |
| JP | 2002-313300 A | 10/2002 | | |
| JP | 2003-109565 A | 4/2003 | | |
| JP | 2005-108750 A | 4/2005 | | |
| KR | 10 2008-0038617 A | 5/2008 | | |

OTHER PUBLICATIONS

Harada. JP 2000-77048 A. Mar. 14, 2000. English machine translation by JPO.*
Korean Office Action in KR 10-2009-0078815, dated Dec. 20, 2010 (Lee, et al.) Korean Office Action from prosecution of corresponding Korean application.

* cited by examiner

*Primary Examiner* — Kenneth Douyette
*Assistant Examiner* — James Lee
(74) *Attorney, Agent, or Firm* — Lee & Morse, P.C.

(57) ABSTRACT

A secondary battery including a can having at least two receiving spaces with a separation space therebetween, an electrode assembly received in the receiving spaces of the can, a collector electrically connected to the electrode assembly, and a cap plate coupled to an upper portion of the can to seal the can.

10 Claims, 8 Drawing Sheets

SECONDARY BATTERY

BACKGROUND

1. Field

Embodiments relate to a secondary battery.

2. Description of the Related Art

Secondary batteries may be rechargeable and miniaturized and may have maximized capacity. Thus, secondary batteries are widely used in high tech electronic devices because they may have high operating voltage and high energy density per unit weight. Lithium ion secondary batteries may be classified into, e.g., cylindrical secondary batteries and prismatic secondary batteries.

The prismatic secondary battery may include a can accommodating an electrode assembly, an electrode terminal electrically connected to the electrode assembly, and a cap plate coupled to an upper portion of the can to seal the can.

As the capacity of a single battery increases, the storage capacity of the battery relative to the surface area may decrease. Heat radiation and dissipation through surfaces of the battery may be an important factor affecting safety.

SUMMARY

Embodiments are directed to a secondary battery, which represent improvements over the related art.

It is a feature of an embodiment to provide a secondary battery having improved heat dissipation.

At least one of the above and other features and advantages may be realized by providing a secondary battery including a can having at least two receiving spaces with a separation space therebetween, an electrode assembly received in the receiving spaces of the can, a collector electrically connected to the electrode assembly, and a cap plate coupled to an upper portion of the can to seal the can.

The can may include long sidewalls having a length, the long sidewalls being spaced apart from and facing each other, short sidewalls connected to the long sidewalls, the short sidewalls having a length less than the length of the long sidewalls and being spaced from and facing each other, separation sidewalls disposed at central portions of the short sidewalls, the separation sidewalls being parallel to the long sidewalls and facing each other, a connection wall disposed on the separation sidewalls, the connection wall connecting facing separation sidewalls, and a bottom wall disposed on a lower portion of the can, the bottom wall connecting the long sidewalls, the short sidewalls, and the separation sidewalls to each other.

The long sidewalls may have a height, the height being greater than or equal to a height of the separation sidewall.

The connection sidewall may have a flat surface.

The connection sidewall may have a curved surface.

The bottom wall may have a width, the width being greater than a width of the connection wall.

The long sidewalls, the short sidewalls, and the separation sidewalls may be disposed to define the receiving spaces.

Separation sidewalls and a connection wall may be disposed to define the separation space.

A number of electrode assemblies in the secondary battery may be equal to a number of receiving spaces in the can.

A single electrode assembly may be received in the at least two receiving spaces.

The electrode assembly may include a first section parallel to the long sidewalls, a second section spaced apart from and facing the first section, and a connection section connecting the first section to the second section.

The connection section of the electrode assembly may have a curved shape.

The can may have a top surface, and the connection section of the electrode assembly may protrude above the top surface of the can.

The connection section may have lateral surfaces and the cap plate may surround the lateral surfaces of the connection section of the electrode assembly.

The cap plate may include a first surface and a second surface, the second surface extending perpendicularly towards the can from the first surface, the can may include a lateral surface, and the second surface of the cap plate may contact the lateral surface of the can.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
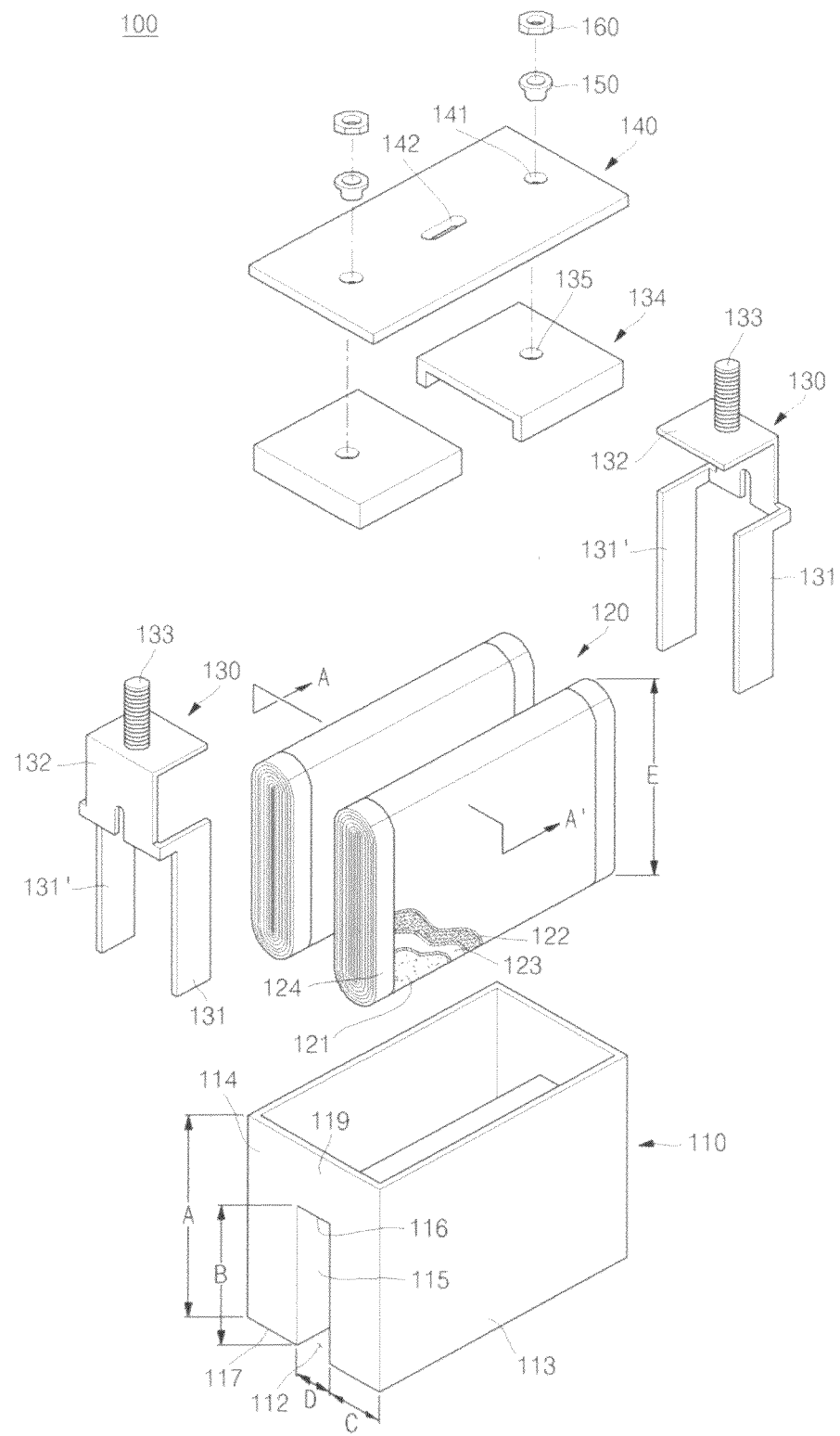
FIGS. 1A and 1B respectively illustrate an exploded perspective view of a secondary battery and a perspective view of a can of the secondary battery according to an embodiment.

Korean Patent Application No. 10-2009-0078815, filed on Aug. 25, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1A illustrates an exploded perspective view of a secondary battery according to an embodiment. Referring to FIG. 1A the secondary battery 100 may include a can 110, an electrode assembly 120, a collector 130, and a cap plate 140. The can 110 may have at least two receiving spaces 111 (see FIG. 1C) with a separation space 112 therebetween.

Figure 1B:
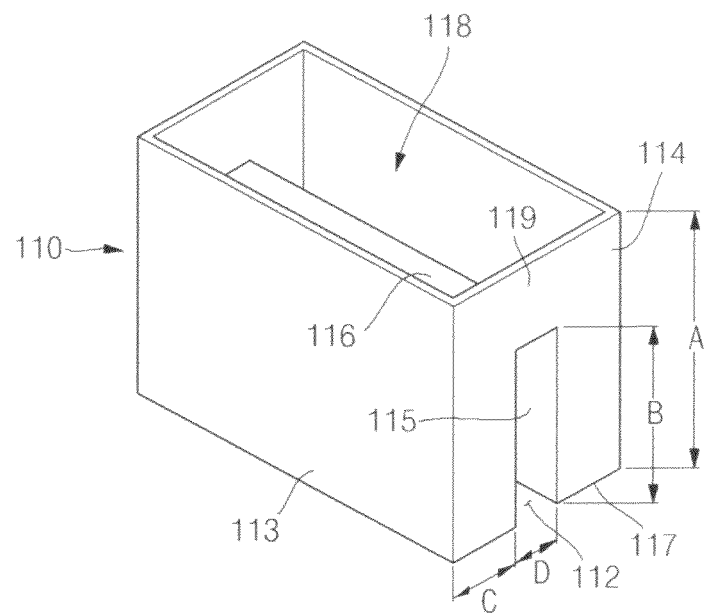

FIG. 1B illustrates a perspective view of the can of the secondary battery of FIG. 1A. Referring to FIG. 1B, the can 110 may include long sidewalls 113, short sidewalls 114 connected to the long sidewalls 113, separation sidewalls 115 disposed at a central portion of the short sidewalls 114, a connection wall 116 connecting between facing short sidewalls 114 and facing separation sidewalls 115, and bottom walls 117 disposed at a lower portion of the can 110 to connect the long sidewalls 113, the short sidewalls 114, and the separation sidewalls 115 to each other.

An opening 118 may be defined in an upper portion of the can 110. The electrode assembly 120 may be received through the opening 118.

The long sidewalls 113 may have facing surfaces spaced from each other. The long sidewalls 113 may have a height A, the height A being greater than a height B of the separation sidewalls 115. The height A of the long sidewalls 113 may represent a vertical height of the can 110. The height B of the separation sidewalls 115 may represent a vertical height of the separation sidewalls 115 on the short sidewalls 114 and parallel to a vertical direction of the can 110.

The short sidewalls 114 may have facing surfaces spaced from each other. The short sidewalls 114 may be connected to the long sidewalls 113 and may have a relatively narrow surface area. The short sidewalls 114 may have a similar configuration to the long sidewalls 113.

The separation sidewalls 115 may connect between the facing short sidewalls 114. The separation sidewalls 115 may be parallel to the long sidewalls 113 and may face each other. The separation sidewalls 115 may have, e.g., a rectangular shape.

The connection wall 116 may have a plane shape, e.g., a rectangular plate shape. An upper region 119 of each short sidewall 114 may be disposed above the connection wall 116, due to a height difference between the height B of the separation sidewalls 115 and the height A of the short sidewalls 114.

The separation sidewalls 115 and the connection wall 116 may define the separation space 112. The separation space 112 may be a space below the connection wall 116 and between the facing separation sidewalls 115. In other words, the short sidewalls 114 may have an open area at a central portion thereof below the upper region 119.

The bottom walls 117 may be disposed on a lower portion of the can 110 to connect the long sidewalls 113, the short sidewalls 114, and the separation sidewalls 115 to each other. The bottom walls 117 may be parallel to the connection wall 116.

The bottom walls 117 may have a width C, the width C being greater than a width D of the connection wall 116. The width C of the bottom walls 117 may be a width of one of the bottom walls 117 in a direction parallel to the short sidewalls 114.

The can 110 may be formed of a conductive metal, e.g., steel plated with aluminum, aluminum alloy, and/or nickel.

As described above, the long sidewalls 113, the short sidewalls 114, and the separation sidewalls 115 may form the at least two receiving spaces 111 to receive the electrode assembly 120 therein.

Therefore, the secondary battery 100 of an embodiment may improve a heat radiation characteristic thereof In other words, the secondary battery 100 may efficiently dissipate heat generated therein by way of an increase in surface area of the electrode assembly 120 contacting the long sidewalls 113, the short sidewalls 114, the separation sidewalls 115, and the bottom walls 117.

The electrode assembly 120 may be inserted in the receiving spaces 111 of the can 110. The electrode assembly 120 may include a separator 123 disposed between a positive electrode plate 121 and a negative electrode plate 122. The positive electrode plate 121, the negative electrode plate 122, and the separator 123 may be stacked and spirally wound in a jelly-roll structure. The electrode assembly 120 may include non-coating portions 124 on ends thereof Each electrode assembly 120 may be independently received into respective receiving spaces 111. That is, at least two electrode assemblies may be provided and may be respectively received into the receiving spaces 111.

The collector 130 may be electrically connected to the electrode assembly 120. The secondary battery 100 may include at least two collectors 130 disposed at ends of the electrode assembly 120 and electrically connected to respective non-coating portions 124. Because the collectors 130 have the same configuration, except in mirror image form, only one collector 130 will be described below.

The collector 130 may include a first collector tab 131, a second collector tab 131', a collector plate 132 connected to the first collector tab 131 and the second collector tab 131', and an electrode terminal 133 protruding upwardly from the collector plate 132.

Because the first collector tab 131 has the same configuration as the second collector tab 131', only the first connector tab 131 will be described below. The first collector tab 131 may be fitted to and connected to the non-coating portion 124 of the electrode assembly 120.

Since the first collector tab 131 may be disposed on the one electrode assembly 120, the electrode assembly 120 may be received corresponding to a space of the can 110. The first collector tab 131 may be generally fixed to the non-coating portion 124 using, e.g., ultrasonic welding.

The collector plate 132 may be connected to the first collector tab 131. Also, the collector plate 132 may be disposed along a lower portion of the cap plate 140 and may be electrically insulated from the cap plate 140, as will be described later.

The electrode terminal 133 may be disposed on the collector plate 132. The electrode terminal 133 may protrude upwardly from the collector plate 132. As described above, each collector 130 may include the first collector tab 131, the second collector tab 131', the collector plate 132, and the electrode terminal 133.

A first insulator 134 may have a terminal hole 135 therein. The electrode terminal 133 may pass through the terminal hole 135 to protrude upwardly from the first insulator 134. The first insulator 134 may have a size sufficient to cover an upper portion of the collector plate 132. That is, the electrode terminal 133 may pass through the first insulator 134 through the terminal hole 135 and the first insulator 134 may cover the upper portion of the collector plate 132.

The first insulator 134 may electrically insulate the collector plate 132 from the cap plate 140. The first insulator 134 may be formed of, e.g., polyethylene, polypropylene, polytetrafluoroethylene, polyethylene terephthalate, and/or styrene butadiene rubber. The first insulator 134 may be disposed between the collector plate 132 of the collector 130 and the cap plate 140.

The cap plate 140 may have a plurality of ends and each end may have a plate shape. The cap plate 140 may have a terminal hole 141 therein and a vent 142 in a center thereof. The electrode terminal 133 of the collector 130 may pass through the cap plate 140 through the terminal hole 141 to protrude upwardly from the cap plate 140. The vent 142 may have a thickness, the thickness being relatively smaller than thicknesses of other portions of the cap plate 140. The vent 142 may prevent the secondary battery 100 from exploding. The cap plate 140 may be coupled to the opening 118 of the can 110 to seal the can 110.

A second insulator 150 may be disposed on the cap plate 140. The electrode terminal 133 may pass through the second insulator 150. The second insulator 150 may electrically insulate the cap plate 140 from the electrode terminal 133. The second insulator 150 may be formed of a material similar to or the same as that of the first insulator 134. The second insulator 150 may be disposed on the cap plate 140 to prevent a nut 160 from electrically contacting the cap plate 140 when the nut 160 is coupled to the electrode terminal 133.

The nut 160 may fix the position of the electrode terminal 133 to thereby fix the collector 130 and the electrode assembly 120 in position. The nut 160 may be disposed on the second insulator 150 and may be coupled to the electrode terminal 133.

Figure 1C:
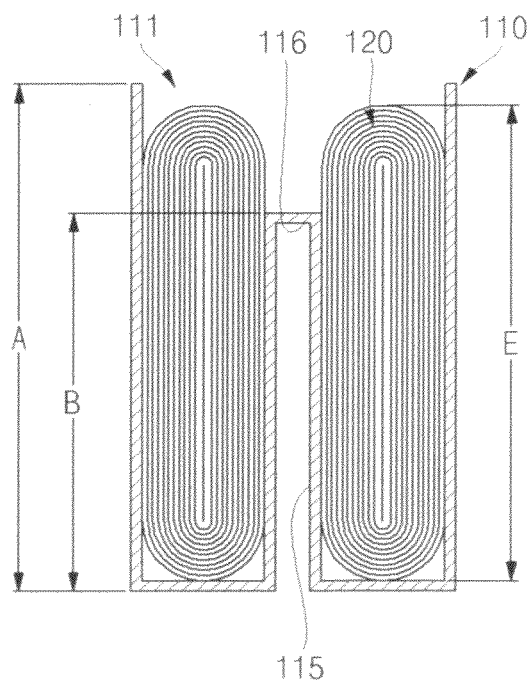
FIGS. 1C and 1D respectively illustrate sectional views of an electrode assembly in the can of FIG. 1A and the can sealed by a cap plate according to an embodiment.
Figure 1D:
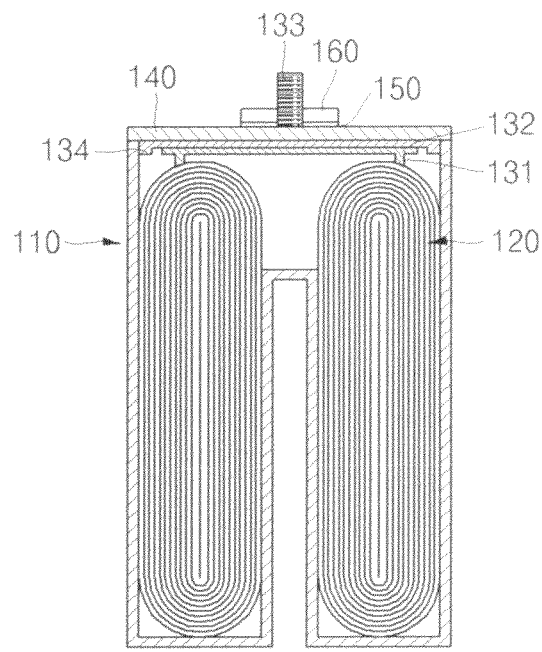

FIGS. 1C and 1D illustrate sectional views taken along line A-A' in a state where the electrode assembly illustrated in FIG. 1A is received into the can and FIG. 1D in particular illustrates the cap plate coupled to the can.

Referring to FIG. 1C, the electrode assemblies 120 may be received into respective receiving spaces 111. An upper end of the respective electrode assemblies 120 may protrude above the connection wall 116. The upper end of the respective electrode assemblies 120 may have a height E, the height E being lower than a height A of the long sidewalls 113 of the can 110. That is, among the height A, the height E, and the height B, the separation sidewalls 115 may have the lowest height B and the long sidewalls 113 of the can 110 may have the highest height A (B<E<A). Here, the height B of the separation sidewalls 115 may represent a vertical distance of the connection wall 116 from the bottom walls 117. In addition, the height E of the respective electrode assemblies 120 may represent a vertical length of the long sidewalls 113.

FIG. 1D illustrates a sectional view of a state in which the can of FIG. 1C is sealed by the cap plate 140. Referring to FIG. 1D, the cap plate 140 may be coupled to the upper portion of the can 110 to seal the can 110.

The electrode assembly 120 and the collector tab 131 coupled to the electrode assembly 120 may be sequentially disposed in an upward direction below the cap plate 140. Also, the collector plate 132 connected to the collector tab 131 and the first insulator 134 electrically insulating the collector plate 132 from the cap plate 140 may be sequentially disposed in an upward direction.

The electrode terminal 133 may protrude from a top surface of the cap plate 140. The electrode terminal 133 may pass through the second insulator 150 and the nut 160.

Figure 2:
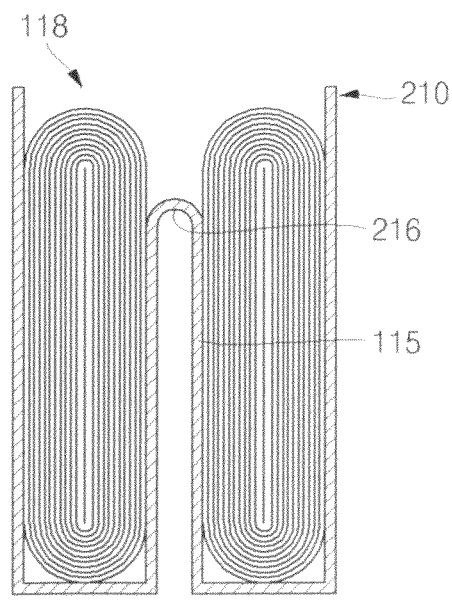
FIG. 2 illustrates a sectional view of an electrode assembly in a can of a secondary battery according to another embodiment.

A can of a secondary battery according to another embodiment will be described below with reference to the drawing figures. FIG. 2 illustrates a sectional view of an electrode assembly in the can of a secondary battery according to another embodiment. Referring to FIG. 2, in the can 210 of the secondary battery according to the present embodiment, a connection wall 216 connecting separation sidewalls 115 to each other may have a curved shape. That is, the connection wall 216 may have a curved shape protruding toward an opening 118 of the can 210. Because remaining aspects of the secondary battery according to the present embodiment may have the same configuration as those of the secondary battery of FIG. 1A, a repeated description thereof is omitted.

Figure 3A:
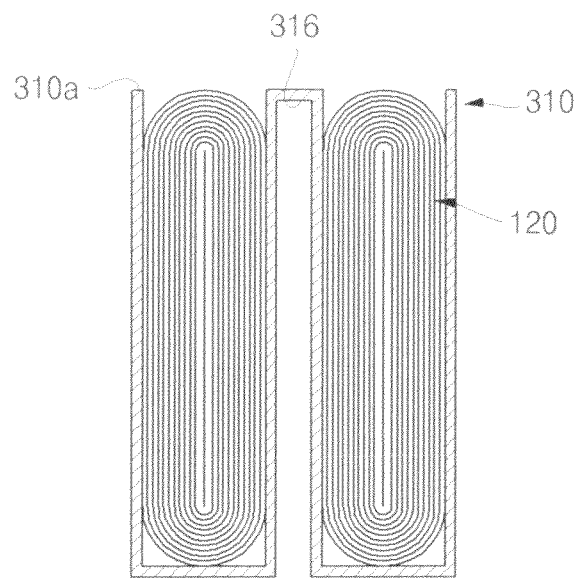
FIGS. 3A and 3B respectively illustrate sectional views of an electrode assembly in a can and the can sealed by a cap plate, according to yet another embodiment.
Figure 3B:
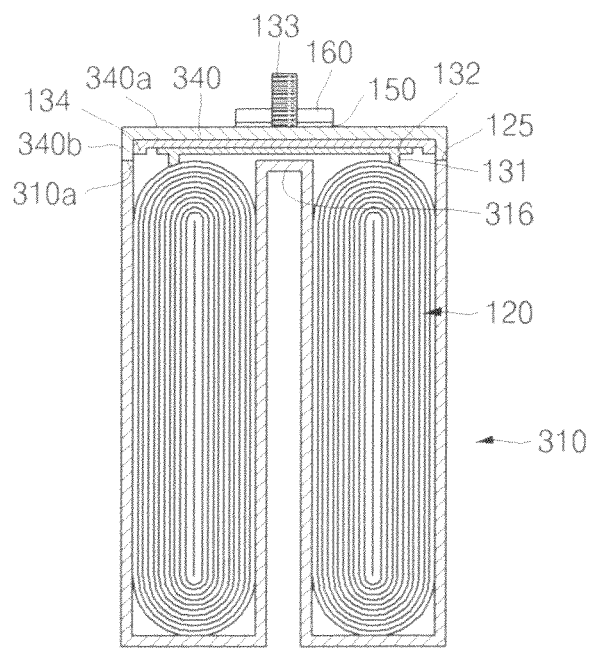

A can of a secondary battery according to yet another embodiment will be described below with reference to the drawing figures. FIGS. 3A and 3B illustrate sectional views of an electrode assembly in a can according to the present embodiment and FIG. 3B in particular illustrates a cap plate coupled to the can.

Referring to FIG. 3A, in the can 310 of the secondary battery according to the present embodiment, a connection wall 316 may have a rectangular plate shape. The connection wall 316 may be horizontally, flatly disposed, e.g., parallel to an upper end 310a of the can 310 and aligned with an upper end of the electrode assembly 120.

Because remaining aspects of the secondary battery according to the present embodiment may have the same configuration as the secondary battery of FIG. 1A, repeated description thereof is omitted.

FIG. 3B illustrates a sectional view of the electrode assembly 120 received in the can 310 and sealed by the cap plate 340. Referring to FIG. 3B, the electrode assembly 120 and a collector tab 131 coupled to the electrode assembly 120 may be sequentially disposed in an upward direction below the cap plate 340. In addition, a collector plate 132 connected to the collector tab 131 and a first insulator 134 electrically insulating the collector plate 132 from the cap plate 140 may be sequentially disposed in an upward direction.

The cap plate 340 may have a first surface 340a disposed in a direction parallel to that of the connection wall 316 and a second surface 340b disposed in a direction perpendicular to the first surface 340a. The second surface 340b may contact the upper end 310a of the can 310 to seal the electrode assembly 120.

Although the collector plate 132 is illustrated as being spaced from the connection wall 316 in FIG. 3B, in an implementation, the collector plate 132 may contact the connection wall 316.

An electrode terminal 133 may protrude from a top surface of the cap plate 340. The electrode terminal 133 may pass through a second insulator 150 and a nut 160. Here, since remaining aspects of the secondary battery according to the present embodiment have the same configuration as those of the secondary battery of FIG. 1A, a repeated description thereof is omitted.

Figure 4A:
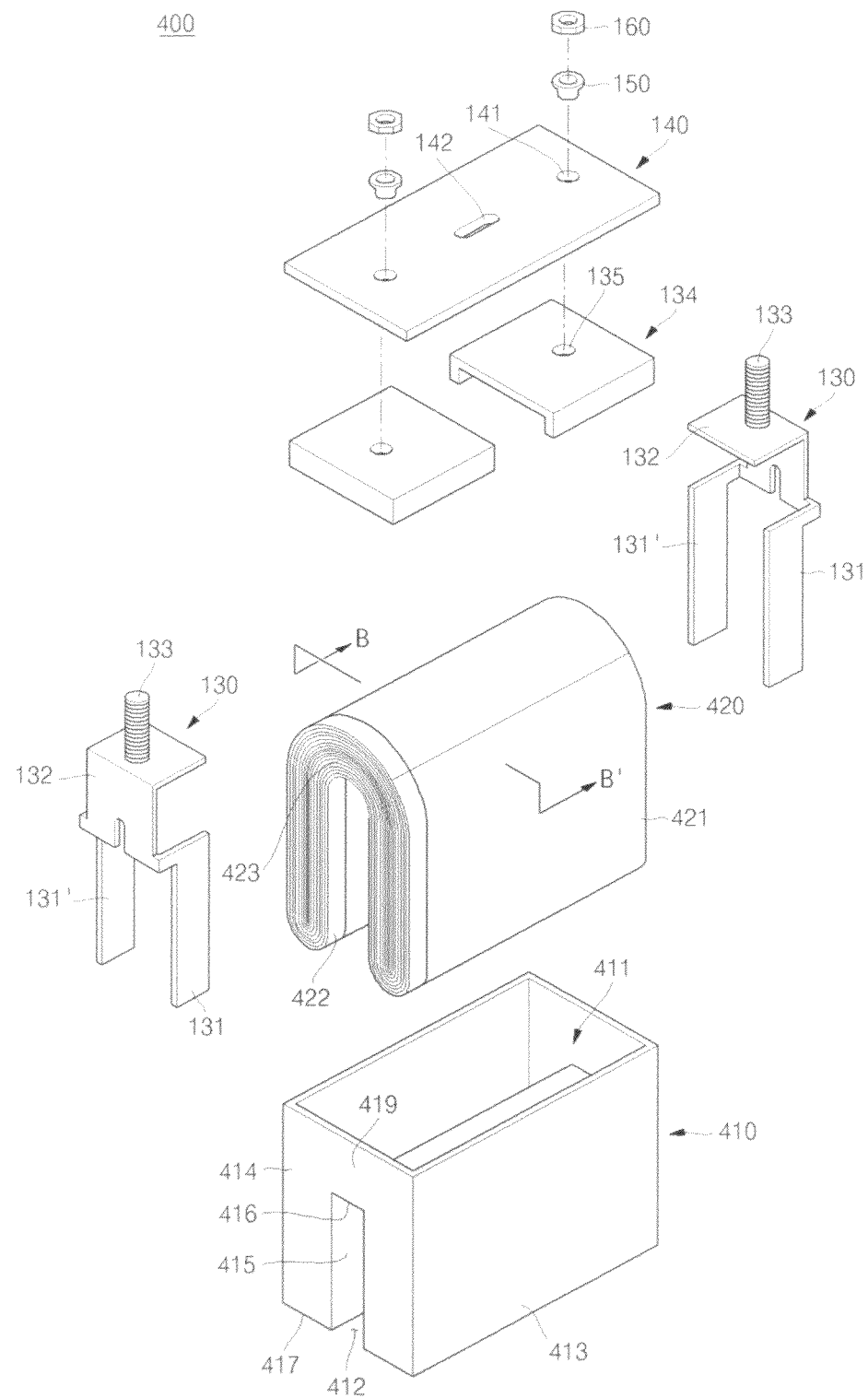
FIG. 4A illustrates an exploded perspective view of a secondary battery according to still another embodiment.

FIG. 4A illustrates an exploded perspective view of a secondary battery according to still another embodiment. Referring to FIG. 4A, a secondary battery 400 according to the present embodiment may include a can 410, an electrode assembly 420, a collector 130, and a cap plate 140. Since the secondary battery 400 has a similar configuration as that of the secondary battery 100 of FIG. 1A, only the parts different from the secondary battery 100 will be described.

The electrode assembly 420 may be integrally formed in one body. The electrode assembly 420 may have a first section 421 disposed in a direction parallel to that of a long sidewall 413 of the can 410, a second section 422 spaced apart from and facing the first section 421, and a connection section 423 connecting the first section 421 to the second section 422. That is, the first section 421, the second section 422, and the connection section 423 may be structurally connected to each other to form the electrode assembly 420 in one body. Here, the connection section 423 may have a curved shape.

Figure 4B:
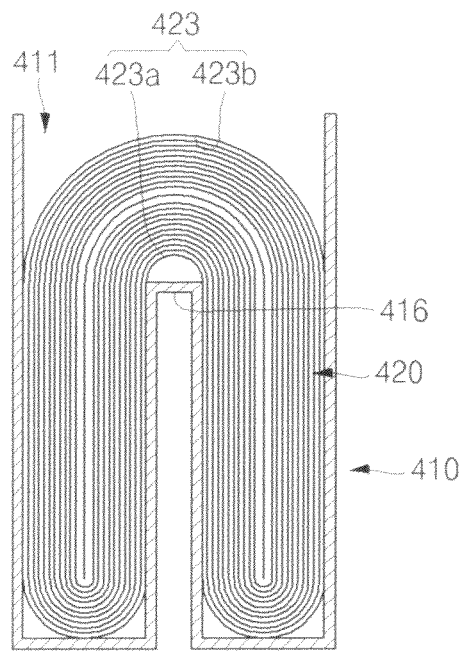
FIGS. 4B and 4C respectively illustrate sectional views of an electrode assembly in a can and the can sealed by a cap plate of the secondary battery of FIG. 4A.
Figure 4C:
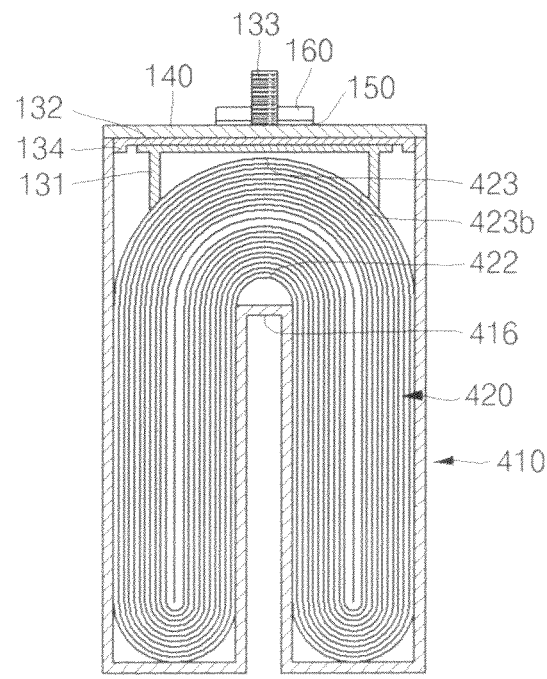

FIGS. 4B and 4C illustrate sectional views taken along line B-B' of FIG. 4A of the electrode assembly in the can and FIG. 4C in particular illustrates the cap plate coupled to the can.

Referring to FIG. 4B, the electrode assembly 420 may be received in a receiving space 411. The connection section 423 may connect the first and second sections 421 and 422 of the electrode assembly 420 to each other to integrally form the electrode assembly 420. The connection section 423 may have a curved shape. In addition, the connection section 423 may have a lower curved surface 423a and an upper curved surface 423b. The lower curved surface 423a may be spaced apart from the connection wall 416. Here, since the connection wall 416 has a plate shape, a space having a half arc shape may be defined between the connection wall 416 and the lower curved surface 423a. Thus, the connection section 423 may protrude upwardly from the connection wall 416.

FIG. 4C illustrates a sectional view of the can sealed by the cap plate. Referring to FIG. 4C, the cap plate 140 may be coupled to an upper portion of the can 410 to seal the can 410. The electrode assembly 420 and a collector tab 131 coupled to the electrode assembly 420 may be sequentially disposed in an upward direction below the cap plate 140. Also, a collector plate 132 connected to the collector tab 131 and a first insulator electrically insulating the collector plate 132 from the cap plate 140 may be sequentially disposed in an upward direction.

Although the collector plate 132 is illustrated as being spaced apart from the connection section 423 in FIG. 4C, in an implementation, the collector plate 132 may contact the connection section 423. Also, an electrode terminal 133 may protrude from the top surface of the cap plate 140. Here, the electrode terminal 133 may pass through a second insulator 150 and a nut 160.

Figure 5:
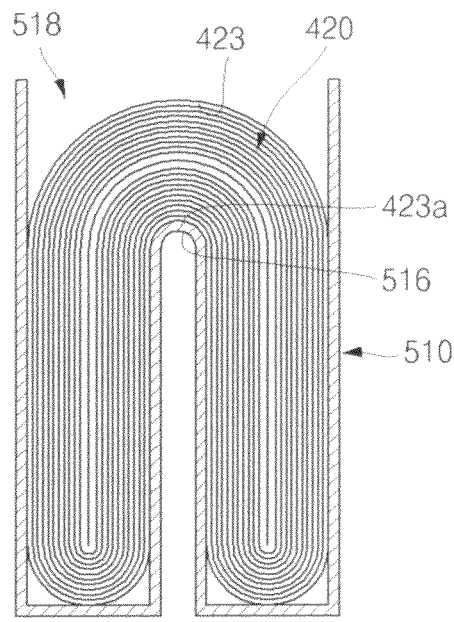
FIG. 5 illustrates a sectional view of another electrode assembly in a can of a secondary battery according to still another embodiment.

FIG. 5 illustrates a sectional view of an electrode assembly received in a can of a secondary battery according to still another embodiment. Referring to FIG. 5, in the can 510 of the secondary battery according to the present embodiment, a connection wall 516 may have a curved shape. In an implementation, the connection wall 516 may have a shape protruding toward an opening 518 of the can 510. The lower curved surface 423a of the connection section 423 of the electrode assembly 420 may contact a top surface of the connection wall 516. Since remaining aspects of the secondary battery according to the present embodiment may have a similar configuration to those of the secondary battery of FIG. 1A, repeated description thereof is omitted.

Figure 6A:
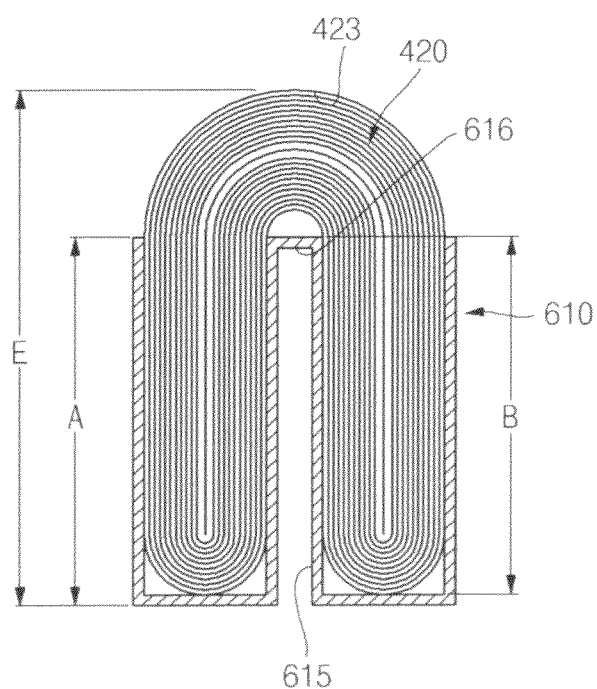
FIGS. 6A and 6B illustrate sectional views of another electrode assembly in a can and the can sealed by a cap plate, according to another embodiment.
Figure 6B:
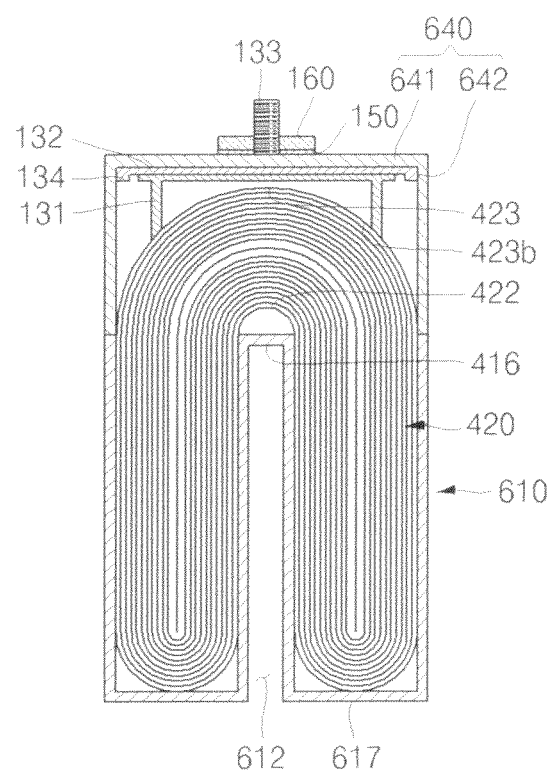

FIGS. 6A and 6B respectively illustrate sectional views of an electrode assembly received in a can and the can sealed by a cap plate in a secondary battery according to still another embodiment. Referring to FIG. 6A, the can 610 of the secondary battery according the present embodiment may have a height A equal to a height B of separation sidewalls 615. The electrode assembly 420 may have a height E, the height E being greater than the height A of the can 610. Thus, the connection section 423 of the electrode assembly 420 may protrude upwardly from a top surface of the can 610. That is, a relation between the heights of the separation sidewall 615, the can 610, and the electrode assembly 420 may be defined as the following: Height B of separation sidewall=Height A of can<Height E of electrode assembly.

Referring to FIG. 6B, a cap plate 640 may surround an upper portion and lateral surfaces of the connection section 423 of the electrode assembly 420 to seal the can 610.

Here, the cap plate 640 may have a first surface having a rectangular plate shape and second surfaces 642 protruding downwardly in a direction perpendicular to that of the first surface 641. A distance between the second surfaces 642 may be equal to a sum of a length of a bottom wall 617 of the can 610 and a length of a separation space 612. Thus, the second surfaces 642 may contact upper ends of the can 610.

Here, the second surfaces may be welded to the upper ends of the can 610 using, e.g., a laser welding method, an ultrasonic welding method, etc.

A pair of collector tabs 131 may be disposed on an upper curved surface 423b of the electrode assembly 420. Also, a first insulator 134 may be disposed on a top surface of a collector plate 132 connected to the collector tabs 131.

Although the collector plate 132 is illustrated as being spaced apart from the connection section 423 in FIG. 6B, in an implementation, the collector plate 132 may contact the connection section 423. Also, an electrode terminal 133 may protrude from a top surface of the cap plate 140. Here, the electrode terminal 133 may pass through a second insulator 150 and a nut 160.

As described above, in the secondary battery according to the embodiments, the can having at least two receiving spaces with the separation space therebetween may increase the surface area of the can contacting the electrode assembly, thereby improving heat radiation and dissipation characteristics of the battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   a can having at least two receiving spaces with a separation space therebetween such that each receiving space is separated from every other receiving space by the separation space;
   an electrode assembly received in the receiving spaces of the can,
   wherein:
      the electrode assembly includes a separator disposed between a positive electrode plate and a negative electrode plate,
      the separator, positive electrode plate, and negative electrode plate are spirally wound; and
      the electrode assembly has an oval-shaped cross-section with a height along a long axis of the oval shape;
   a collector electrically connected to the electrode assembly; and
   a cap plate coupled to an upper portion of the can to seal the can,
   wherein the can includes:
   long sidewalls having a length, the long sidewalls being spaced apart from and facing each other,
   short sidewalls connected to the long sidewalls, the short sidewalls having a length less than the length of the long sidewalls and being spaced from and facing each other, and
   separation sidewalls disposed at central portions of the short sidewalls, the separation sidewalls being parallel to the long sidewalls, the separation sidewalls being flat, and the separation sidewalls facing each other,
   wherein the separation sidewalls are parallel to the long axis of the oval-shaped cross-section of the electrode assembly, and a height of the separation sidewalls is less than or equal to the height of the oval-shaped cross-section of the electrode assembly.

2. The secondary battery as claimed in claim 1, wherein the can further includes:

a connection wall disposed on the separation sidewalls, the connection wall connecting facing separation sidewalls; and a bottom wall disposed on a lower portion of the can, the bottom wall connecting the long sidewalls, the short sidewalls, and the separation sidewalls to each other.

3. The secondary battery as claimed in claim 1, wherein the long sidewalls have a height, the height being greater than or equal to a height of the separation sidewalls.

4. The secondary battery as claimed in claim 2, wherein the connection wall has a flat surface.

5. The secondary battery as claimed in claim 2, wherein the connection wall has a curved surface.

6. The secondary battery as claimed in claim 2, wherein the bottom wall has a width, the width being greater than a width of the connection wall.

7. The secondary battery as claimed in claim 1, wherein the long sidewalls, the short sidewalls, and the separation sidewalls are disposed to define the receiving spaces.

8. The secondary battery as claimed in claim 1, wherein separation sidewalls and a connection wall are disposed to define the separation space.

9. The secondary battery as claimed in claim 1, wherein a number of electrode assemblies in the secondary battery is equal to a number of receiving spaces in the can.

10. The secondary battery as claimed in claim 1, wherein:
   the cap plate includes a first surface and a second surface, the second surface extending perpendicularly towards the can from the first surface,
   the can includes a lateral surface, and
   the second surface of the cap plate contacts the lateral surface of the can.

* * * * *